(12) United States Patent
Liu

(10) Patent No.: US 9,643,361 B2
(45) Date of Patent: May 9, 2017

(54) METHOD AND APPARATUS FOR THREE-DIMENSIONAL ADDITIVE MANUFACTURING WITH A HIGH ENERGY HIGH POWER ULTRAFAST LASER

(71) Applicant: Jian Liu, Sunnyvale, CA (US)

(72) Inventor: Jian Liu, Sunnyvale, CA (US)

( * ) Notice: Subject to any disclaimer, the term of this patent is extended or adjusted under 35 U.S.C. 154(b) by 400 days.

(21) Appl. No.: 14/324,066

(22) Filed: Jul. 3, 2014

(65) Prior Publication Data
US 2016/0067778 A1 Mar. 10, 2016

Related U.S. Application Data

(63) Continuation-in-part of application No. 14/287,994, filed on May 27, 2014.

(51) Int. Cl.
| | |
|---|---|
| *B29C 67/00* | (2017.01) |
| *B22F 3/105* | (2006.01) |
| *B28B 1/00* | (2006.01) |
| *B33Y 30/00* | (2015.01) |
| *B33Y 10/00* | (2015.01) |
| *B33Y 50/02* | (2015.01) |

(Continued)

(52) U.S. Cl.
CPC ........ *B29C 67/0085* (2013.01); *B22F 3/1055* (2013.01); *B23K 26/0624* (2015.10); *B23K 26/342* (2015.10); *B28B 1/001* (2013.01); *B29C 67/0077* (2013.01); *B33Y 10/00* (2014.12); *B33Y 30/00* (2014.12); *B33Y 50/02* (2014.12); *B22F 2003/1057* (2013.01); *Y02P 10/295* (2015.11)

(58) Field of Classification Search
CPC ........................ B29C 67/0085; B29C 67/077
See application file for complete search history.

(56) References Cited

U.S. PATENT DOCUMENTS

| | | | | |
|---|---|---|---|---|
| 5,578,227 | A | * | 11/1996 | Rabinovich ............ B23K 26/34 156/180 |
| 5,597,589 | A | | 1/1997 | Deckard |
| 8,199,183 | B2 | | 6/2012 | Hosen et al. |

(Continued)

OTHER PUBLICATIONS https://en.wikipedia.org/wiki/Circular_polarization (retrieved Feb. 6, 2017).*

*Primary Examiner* — Timothy Kennedy
(74) *Attorney, Agent, or Firm* — Taboada Law Firm, PLLC; John M. Taboada

(57) ABSTRACT

Methods and systems for three-dimensional additive manufacturing of samples are disclosed, including generating electromagnetic radiation from an ultrashort pulse laser, wherein the electromagnetic radiation comprises a wavelength, a pulse repetition rate, a pulse width, a pulse energy, and an average power; focusing the electromagnetic radiation into a focal region; using a powder delivery system comprising a powder vessel, a roller, and a receptacle to deposit one or more powders from the powder vessel into a receptacle at the focal region of the electromagnetic radiation and to spread the one or more powders in the receptacle into a fabrication powder bed; and using a computer to adjust the micro and macro pulses, macro pulse repetition rate, and the average power of the ultrashort pulse laser. The samples may be made with micron and/or submicron level precision and/or feature size and may be made using high temperature materials. Other embodiments are described and claimed.

49 Claims, 18 Drawing Sheets

(51) Int. Cl.
*B23K 26/0622* (2014.01)
*B23K 26/342* (2014.01)

(56) References Cited

U.S. PATENT DOCUMENTS

| | | | |
|---|---|---|---|
| 8,653,409 B1 | 2/2014 | Sodhi | |
| 2003/0052105 A1* | 3/2003 | Nagano | B23K 26/0604 219/121.83 |
| 2006/0192322 A1* | 8/2006 | Abe | B22F 3/1055 264/497 |
| 2011/0117268 A1* | 5/2011 | Batchelder | B29C 67/0055 427/8 |
| 2012/0138586 A1* | 6/2012 | Webster | A61B 18/20 219/121.64 |
| 2015/0130118 A1* | 5/2015 | Cheng | B22F 3/1055 264/497 |
| 2015/0273631 A1* | 10/2015 | Kenney | B22F 3/1055 419/53 |

* cited by examiner

METHOD AND APPARATUS FOR THREE-DIMENSIONAL ADDITIVE MANUFACTURING WITH A HIGH ENERGY HIGH POWER ULTRAFAST LASER

I. CROSS REFERENCE TO RELATED APPLICATIONS

The present application is a Continuation-In-Part of U.S. patent application Ser. No. 14/287,994, titled "Method and Apparatus for Three-Dimensional Additive Manufacturing with a High Energy High Power Ultrafast Laser," filed May 27, 2014. All the contents of which are hereby incorporated by reference.

II. BACKGROUND

The invention relates generally to the field of three-dimensional additive manufacturing. More particularly, the invention relates to a method and apparatus for additive manufacturing of materials (metals, ceramics, glasses, semiconductors) with a high energy, high power ultrafast laser.

III. SUMMARY

In one respect, disclosed is an apparatus for three-dimensional additive manufacturing comprising: an ultrashort pulse laser, wherein the ultrashort pulse laser generates an electromagnetic radiation, wherein the electromagnetic radiation comprises a wavelength, a pulse repetition rate, a pulse width, a pulse energy, and an average power; a focusing mechanism comprising a focus range, and wherein the focusing mechanism is configured to focus the electromagnetic radiation into a focal region; a powder delivery system, wherein the powder delivery system comprises: a powder vessel; a roller; and a receptacle; wherein the powder delivery system is configured to deposit one or more powders into the receptacle at the focal region of the electromagnetic radiation; wherein the powder vessel is configured to hold the one or more powders; and wherein the roller is configured to spread the one or more powders in the receptacle into a fabrication powder bed; and a computer coupled to the ultrashort pulse laser, wherein the computer is configured to adjust the pulse repetition rate, adjust the average power of the ultrashort pulse laser, and coordinate the focusing mechanism, powder delivery system, and the one or more stages. The computer can also be used to convert the AutoCAD or SolidWorks file of the sample into 3D printing procedures and contours to make layer-by-layer printing of predefined shapes or devices.

In another respect, disclosed is a method for three-dimensional additive manufacturing comprising: generating electromagnetic radiation from an ultrashort pulse laser, wherein the electromagnetic radiate on comprises a wavelength, a pulse repetition rate, a pulse width, a pulse energy, and an average power; focusing the electromagnetic radiation into a focal region; using a powder delivery system comprising a powder vessel, a roller, and a receptacle to deposit one or more powders from the powder vessel into a receptacle at the focal region of the electromagnetic radiation and to spread the one or more powders in the receptacle into a fabrication powder bed; using one or more stages to position a sample within the scanning and focus range of the electromagnetic radiation; and using a computer to adjust the pulse repetition rate, adjust the average power of the ultrashort pulse laser, and coordinate the focusing mechanism, powder delivery system, and the one or more stages.

The method may further comprise using the computer or another computer to convert the AutoCAD or SolidWorks file of the sample into 3D printing procedures and contours to make layer-by-layer printing of predefined shapes or devices.

Numerous additional embodiments are also possible.

IV. BRIEF DESCRIPTION OF THE DRAWINGS

Other objects and advantages of the invention may become apparent upon reading the detailed description and upon reference to the accompanying drawings.

Figure 1:
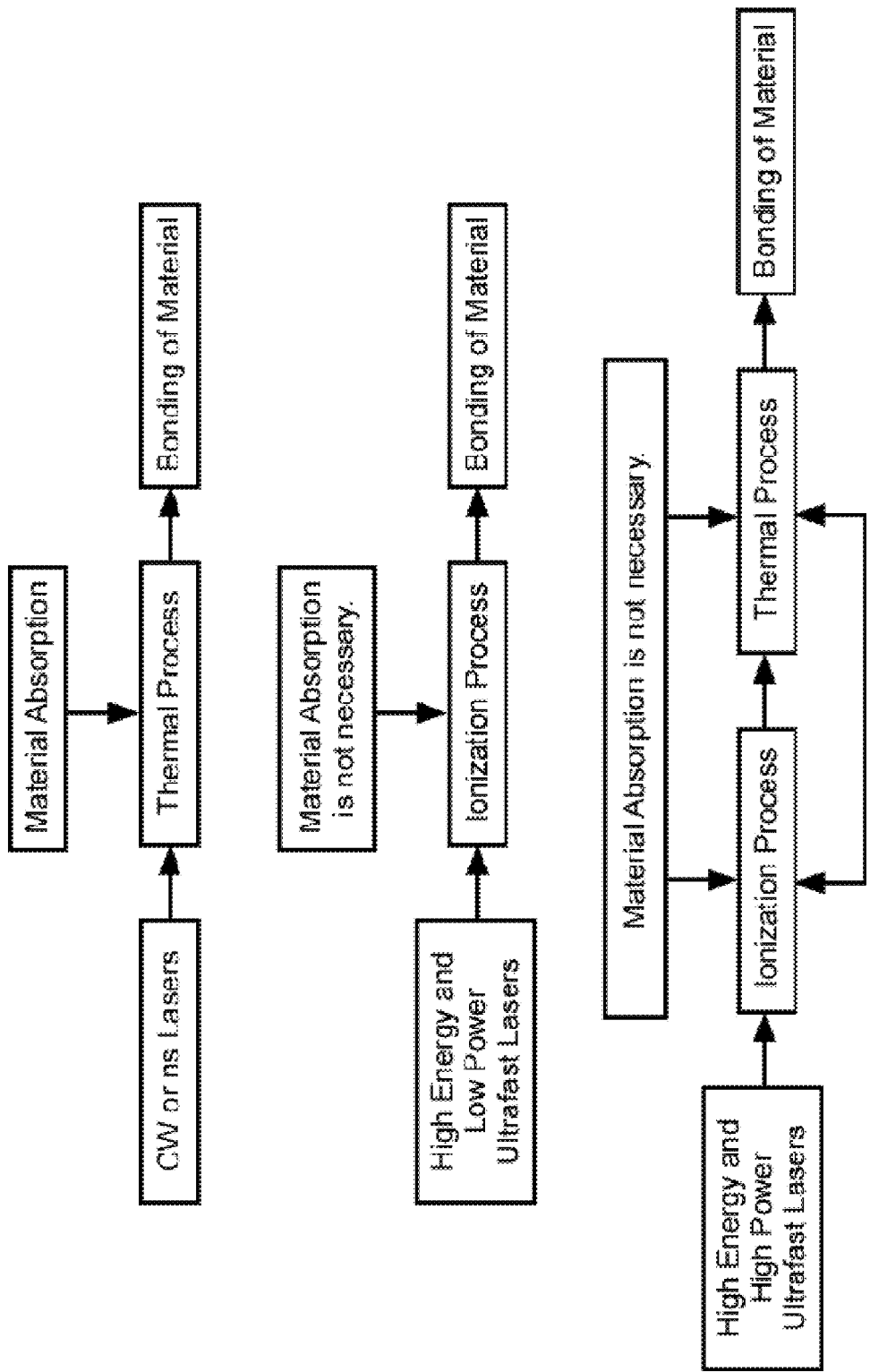
FIG. 1 is a block diagram showing the different processes involved in the bonding of material during additive manufacturing with different laser sources, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Additive manufacturing (AM) is gaining great interest now that many industrial metals like titanium and aluminum are used in established AM processes. However, some challenges still remain. Examples of these challenges are listed as follows.

One challenge is in the production of micro parts. Currently, parts with a resolution of 35 µm can be made from tungsten using continuous wave (CW) fiber laser micro sintering as reported by P. Regenfuss, R. Ebert, and H. Exner, in "Laser Micro Sintering: a Versatile Instrument for the Generation of Microparts." (Laser Technik Journal, Vol. 4, Issue 1, Pages 26-31, January 2007) These micro parts are being used as micro-engines in micro-satellites to maneuver the satellites while in orbit and in micro-robots to propel the robots. Unlike bulk engines, which can be assembled by several separated components, micro-engines are sized from millimeters to a few centimeters and thus have to be made as a single piece with high resolution at the micron level. Additionally, since the engines are composed of various types of materials (e.g. steel, nickel, titanium), complex structure, and shapes, especially irregular shapes, the use of conventional methods of scaling down in size while keeping the desired performance and robustness (e.g. stress, tension, strength, fatigue, thermal cycling, thrust) is limited. The use of CW lasers for machining micro parts can only go so far since CW lasers produce a heat affected zone (HAZ) which limits the process resolution and quality, such as strength and surface roughness, of micro-sized parts. A post process is usually required to try to alleviate some of these shortcomings, but this in turn further limits the miniaturization of micro devices such as engines.

Another challenge is in the production of high temperature metal parts. To date, the majority of AM technology development has focused on conventional structural materials such as titanium and steel. The use of AM technology to refractory metal alloy components, such as tools to work metals at high temperatures, wire filaments, rocket/airplane engines and nozzles, casting molds, and chemical reaction vessels in corrosive environments for example, holds even greater potential to drive affordability given the high raw material costs and complex processing methods associated with such refractory metal alloy products. Refractory metals are a class of metals that are extraordinarily resistant to heat and wear, are chemically inert, and have a relatively high density. The expression "refractory metals" is mostly used in the context of materials science, metallurgy, and engineering. Even so, the definition of which elements belong to the "refractory metals" group differs. The most common definition includes five elements: two of the fifth period (niobium and molybdenum) and three of the sixth period (tantalum, tungsten, and rhenium). Refractory metals all share some properties, including a melting point above 2000° C. and high hardness at room temperature. The melting points of niobium, molybdenum, tantalum, tungsten, and rhenium, are 2750° C., 2896° C., 3290° C., 3695° C., and 3459° C., respectively. As a reference, titanium and aluminum have melting points of roughly 1,650° C. and 650° C., respectively. The high melting points of refractory metals make powder metallurgy complicated for fabricating components from these metals. CW or long pulse (>ns) mode laser processing can only heat the metals to 1500° C. normally, which is the base line of the plots shown in FIG. 3A and FIG. 3B. So, for refractory metals or ceramics with melting temperatures over 2000° C., CW laser additive manufacturing is a difficult or impossible process.

A third challenge is in the production of ceramic parts. Ultra high temperature ceramics (UHTCs), such as hafnium (Hf) and zirconium (Zr) based diboride ($HfB_2$ and $ZrB_2$), titanium carbide (TiC), titanium nitride (TiN), thorium dioxide ($ThO_2$), silicon carbide (SiC), tantalum carbide (TaC) and their associated composites, have melting temperatures of over 3000° C. Thus, similar to that of refractory metals, CW or long pulse (>ns) laser AM processing is not possible for melting and bonding.

Given these challenges, methods and apparatuses are needed for resolving either one of the following issues or both: 1) precise AM process control while concurrently reducing thermo-mechanical stresses and reducing the HAZ to achieve 3D micro-devices, such as engines, nozzles, micro-robots, and implantable devices; and 2) additive manufacturing with high temperature materials (refractory metals and ceramics). The methods and apparatuses of the invention described herein may solve these shortcomings as well as others by proposing a novel method and apparatus for three-dimensional additive manufacturing by selective laser melting with a high energy high power ultrafast laser.

With CW or nanosecond (ns) lasers, the bonding of materials is a thermal process which necessitates that the materials to be bonded during additive manufacturing absorb at the CW or ns laser wavelength. For high energy, low power ultrafast lasers, the bonding of materials is an ionization process where material absorption is not necessary. In comparison, for the novel method and apparatus for additive manufacturing by selective laser melting with a high energy, high power ultrafast laser of this invention, the bonding of materials is both an ionization process and a thermal process. Material absorption is not necessary in either the ionization process or the thermal process for additive manufacturing by selective laser melting with a high energy, high power ultrafast laser.

Figure 2:
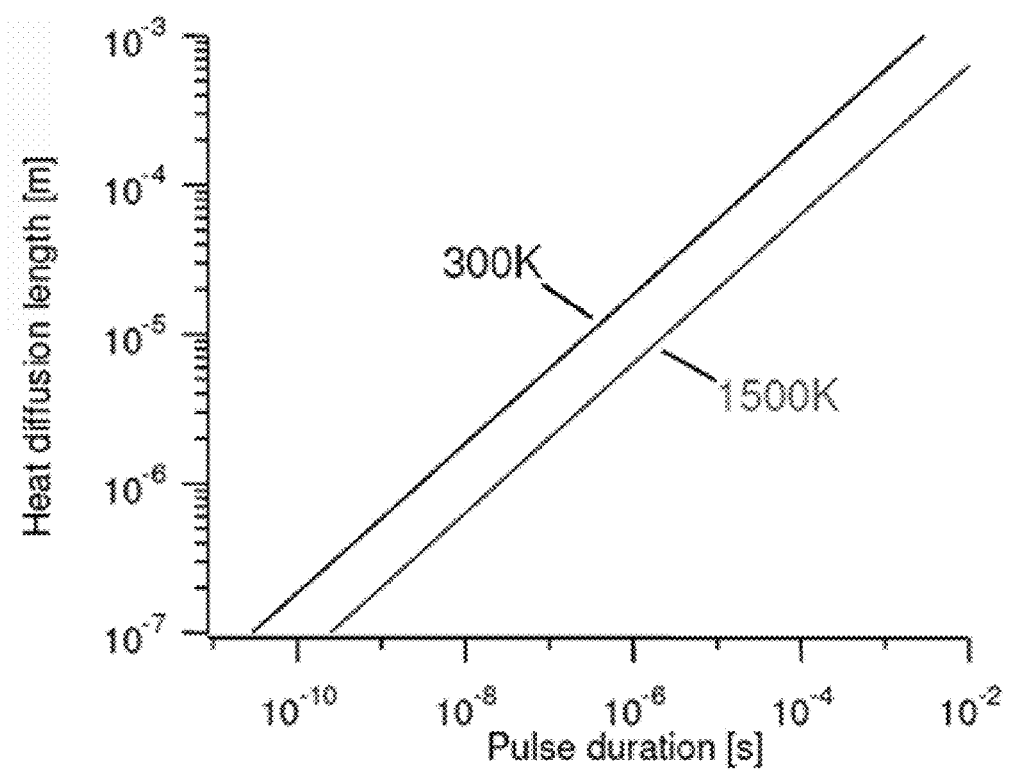
FIG. 2 is a graph of the heat diffusion length versus pulse duration, in accordance with some embodiments.

FIG. 2 is a graph of the heat diffusion length versus pulse duration, in accordance with some embodiments.

Figure 3A:
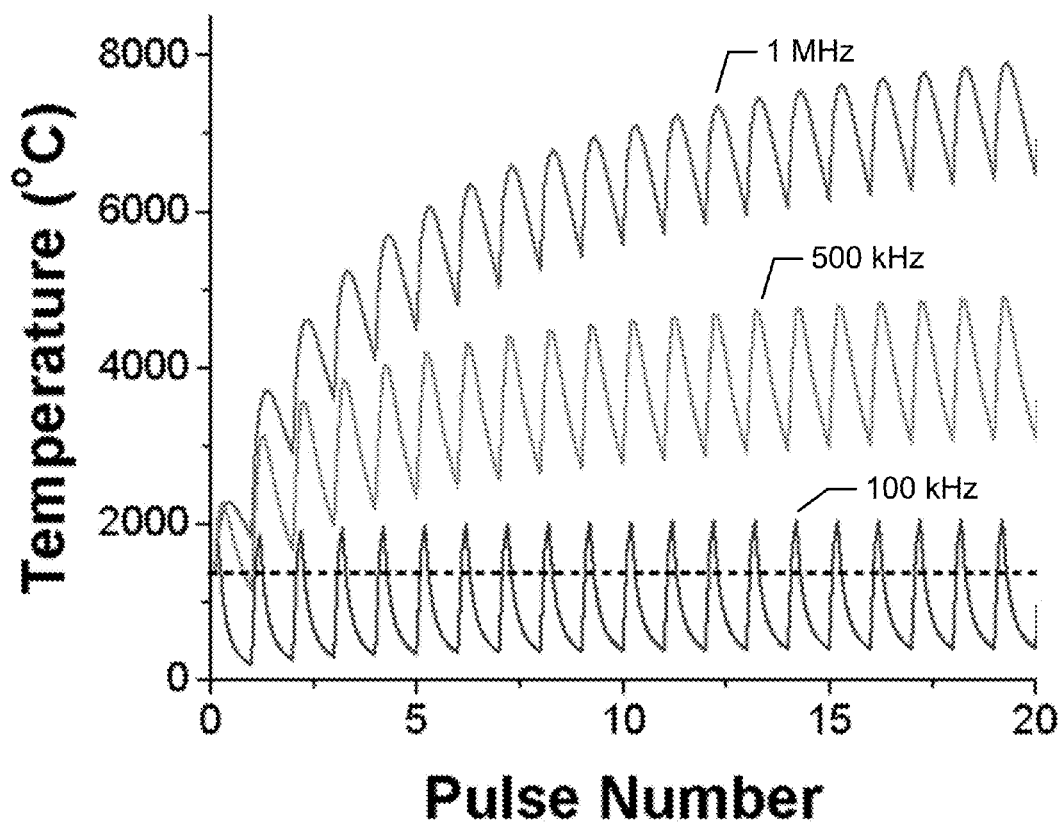
FIG. 3A is a graph of the finite-difference model of temperature versus exposure for various pulse repetition rates.
Figure 3B:
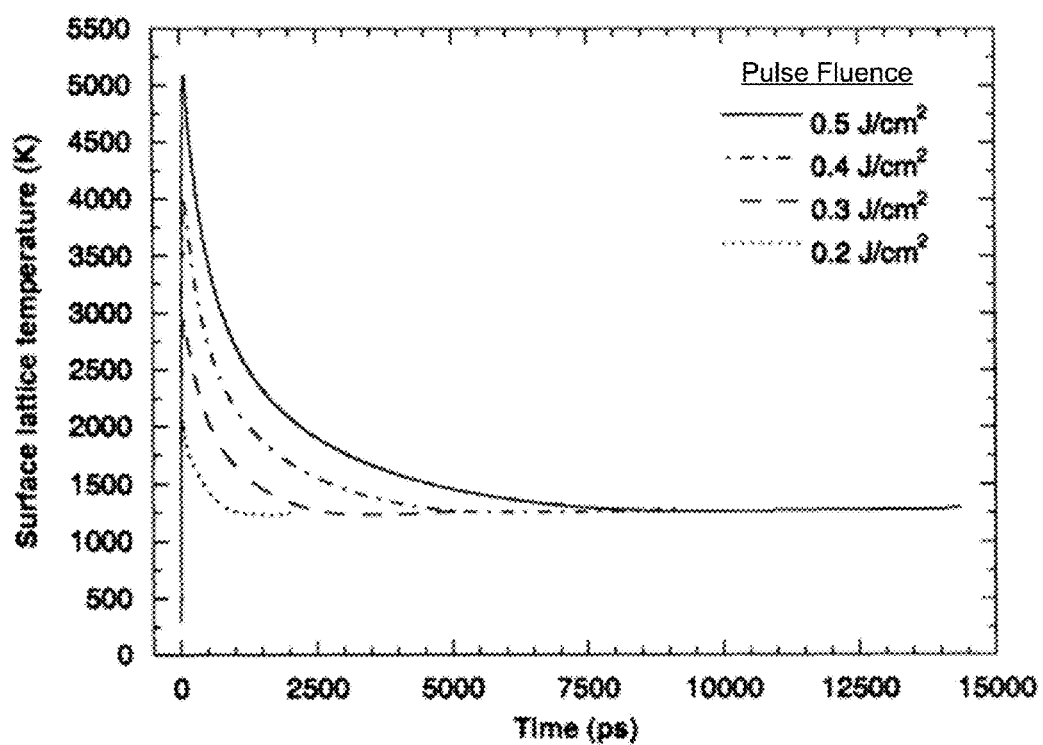
FIG. 3B is a graph of lattice temperature of fs laser process at different fluence of single pulse.

FIG. 3A is a graph of the finite-difference model of temperature versus exposure for various pulse repetition rates. FIG. 3B is a graph of lattice temperature of fs laser process at different fluence of single pulse.

Figure 4:
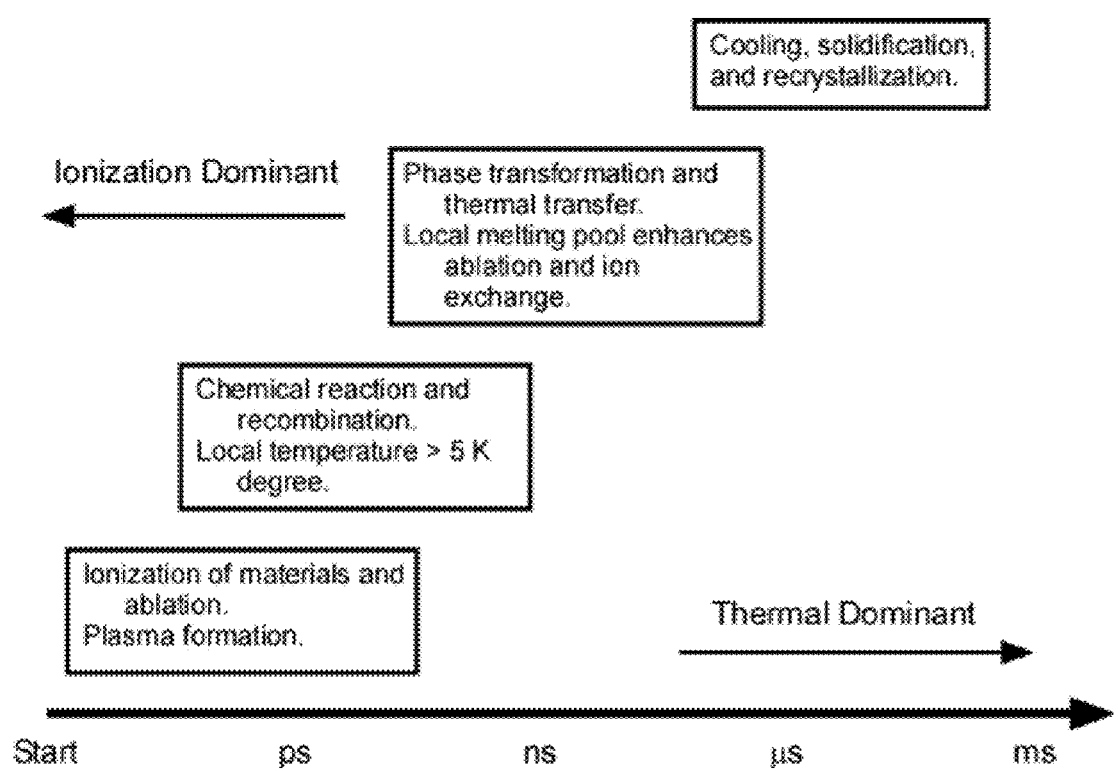
FIG. 4 is a graph of the material process mechanisms for pulsed lasers, in accordance with some embodiments.

FIG. 4 is a graph of the material process mechanisms for pulsed lasers, in accordance with some embodiments.

Femtosecond (fs) pulsed lasers have been widely used in many fields including optical waveguide writing, active photonic devices, and bonding of transparent materials. At the high peak intensity generated by fs lasers, a wide range of materials may be ionized and joined. The mechanism of ultrashort laser pulse modification of materials involves absorption of fs laser energy by materials (e.g., silicon, metal, glass, and polymer) and subsequent dissipation of the absorbed energy. FIG. 2 illustrates the heat diffusion length as a function of the pulse duration for a sample within a 300 K to 1500 K temperature range. As the pulse duration is shortened, the heat diffusion length is reduced, thus resulting in less HAZ.

The energy absorption process in the context of fs-laser ablation follows the sequential steps of 1) production of initial seed electrons through either nonlinear photoionization of free electrons or excitation of impurity defects, 2) avalanche photoionization, and 3) plasma formation. Note, the laser energy is only absorbed in the small focal volume of the laser, where the intensity is high enough for multiphoton ionization to occur in less than a picosecond (ps).

The energy dissipation process involves the transfer of the energy from the hot plasma created by laser pulses to the lattice, resulting in the modified regions in the material. This process is less well understood than the energy absorption process. It is known that the energy dissipation process occurs on a timescale of hundreds of nanoseconds (ns) to microseconds ($\mu$s), substantially longer than the hundreds of fs required for the energy absorption process. It is believed that the primary energy dissipation mechanisms are a combination of thermal diffusion and shockwave generation, though it remains uncertain about which process is dominant and may depend on the precise writing conditions (e.g., pulse fluence, repetition rate).

For 1 kHz fs-laser systems, the time between successive pulses is on the order of a couple milliseconds, thus allowing for any thermal energy that has been deposited by the fs-laser pulse to fully dissipate from the irradiated region. However, for 1 MHz or higher PRR fs-laser systems the time between pulses occurs at the microsecond timescale, allowing for multiple fs-laser pulses to deposit their energy before the energy can diffuse to the surrounding lattice via thermal processes. Such a physical process will lead to heat accumulation for local temperature increase (>6,000° C.), and an observably large melted volume that extends beyond the focal volume. The difference between these two energy absorption processes can be observed in the model illustrated in FIG. 3A as reported by Mazur et al. (Nature Photonics, Vol. 2, 219 (2008)). A single pulse induced lattice temperature plot is also shown for comparison in FIG. 3B as reported by I. H. Chowdhury and X. Xu in "Heat transfer in fs laser processing of metal." (Numerical Heat Transfer, A 44: 219-232, 2003). CW mode laser processing can only heat the metals to 1500° C. normally, which is the base line of the plots. So, for refractory metals or ceramics with melting temperatures over 2000° C., CW laser AM process is a difficult or impossible process. The high PRR fs laser based AM is a disruptive technique.

The end results of the fs laser-material interaction are related with physical, chemical, and mechanical changes of the material after exposure to the laser beam. FIG. 4 summarizes the mechanisms (ionization, plasma formation, chemical reaction and recombination, phase transformation and thermal transfer, cooling, solidification, and recrystallization) that guide the laser processing. For shorter pulse widths, ionization is the dominant process and as pulse widths get longer toward the microsecond and longer time frame, thermal processes dominate. A rule of thumb is that when the pulse width is less than 1 ps, the thermal diffusion can be confined in micron dimension and HAZ can be reduced and/or even eliminated.

When ultrafast lasers are combined with high power (thermal induced bonding) (as high as kW level) operation, both advantages of ultrafast process (ionization) and thermal process result in strong, high speed bonding. The ionization process helps disassemble the chemical or atomic bonds of the material being welded and re-bond through ultrafast chemical reaction to form strong stable phase structure. This process of bond disassembly does not occur for thermal bonding. The high power operation further helps strengthen the bonding areas. Moreover, the high power operation further reduces the threshold of ionization and results in the strong bonding of dissimilar materials.

Many parameters impact three-dimensional AM quality. In terms of laser parameters; energy, pulse width, average power, pulse repetition rate (PRR), peak power, beam quality, focal spot size, scanning speed and contour, and mode of operation all impact the quality. In terms of AM dynamics; heat flow, chemical reaction, metal evaporation, thermal diffusion and transfer, and stress and fatigue affect quality. In terms of metallurgy; solidification and cooling, composition, powder size and shape, grain/microstructure formation, phase transformation, cracking, and femtochemistry all influence quality. Ultrafast laser based AM is a very complicated process that involves many possible parameter variables.

Figure 5:
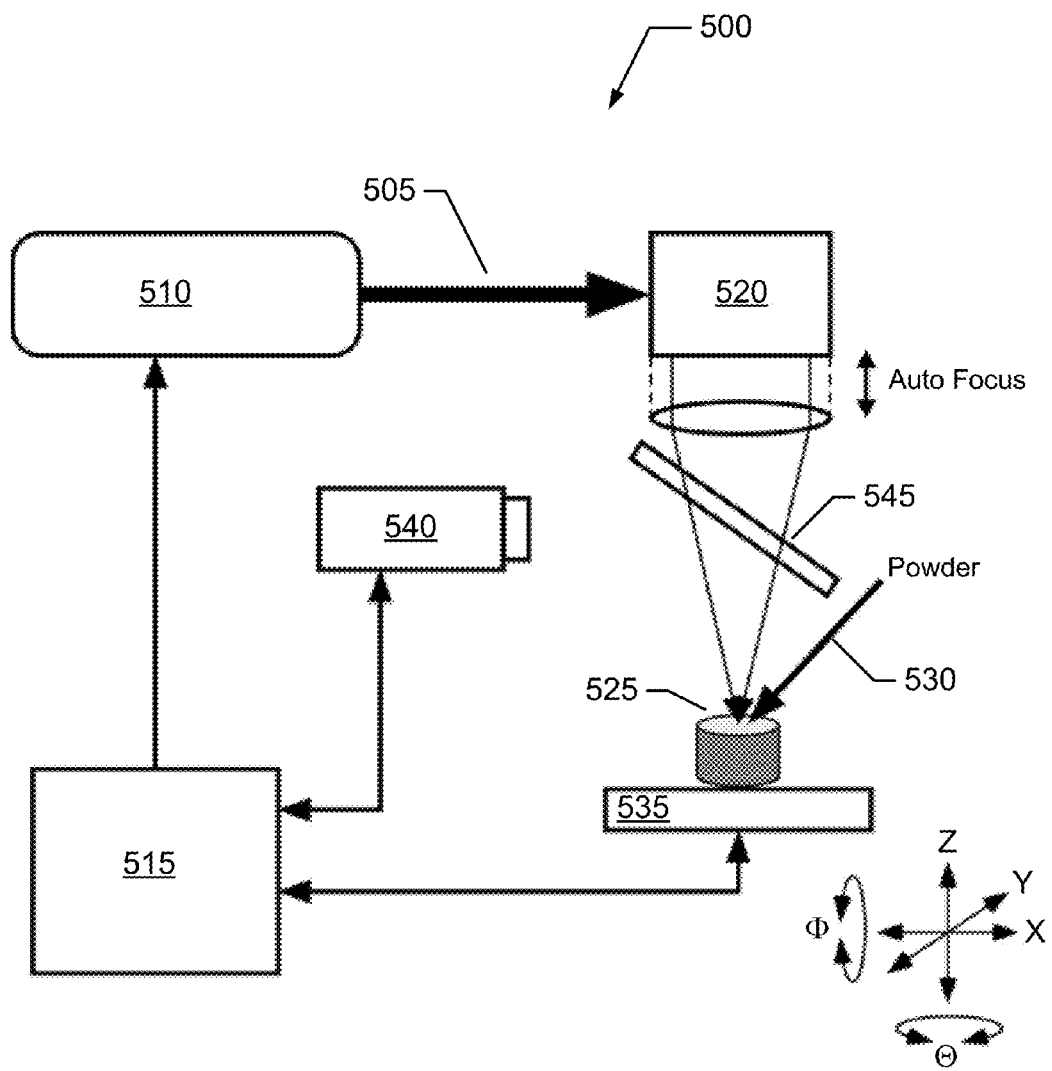
FIG. 5 is a schematic illustration of an apparatus for additive manufacturing with a high energy high power ultrafast laser, in accordance with some embodiments.

FIG. 5 is a schematic illustration of an apparatus for additive manufacturing with a high energy high power ultrafast laser, in accordance with some embodiments.

In some embodiments, apparatus 500 comprises a high energy, high power laser pulse 505 generated by a high pulse repetition rate fs laser 510. In some embodiments, the laser 510 is a fiber laser. The high energy, high power laser may also be a thin disk laser or a hybrid fiber laser/thin disk laser. The laser will have a PRR from about 0.1 MHz up to 1 GHz, an average power of about 1 to 2000 W, a pulse width of about 0.1 to 1 ns, an energy from about 0.1 $\mu$J to 30 mJ, and a wavelength between about 0.2 to 3 $\mu$m. Ideally, it should have diffraction limited beam quality (single mode), but in practice, it can be multi-mode as well. The small spot size allows for precise focusing of fs pulses with excellent beam quality (nature of fiber laser) which is favorable for microscale AM processes. Examples of ultrafast fiber lasers include but are not limited to ytterbium (Yb) doped fiber laser at 1025-1100 nm and its harmonic generations to green and UV, erbium (Er) doped fiber laser at 1025-1610 nm and its harmonic generations, thulium (Tm) doped fiber laser at 1950-2050 nm, holmium (Ho) doped fiber laser at 2050-2150 nm, and Er:ZBLAN fiber lasers at 2700-2900 nm. Examples of thin disk lasers include but are not limited to potassium gadolinium tungstate (KGW) or potassium yttrium tungstate (KYW) based lasers (1030-1070 nm) and its harmonic generations (green and UV). Examples of hybrid fiber laser/thin disk laser include using fs fiber laser as a seeding laser for a thin disk amplifier to obtain both high energy and high power fs lasers.

Figure 6:
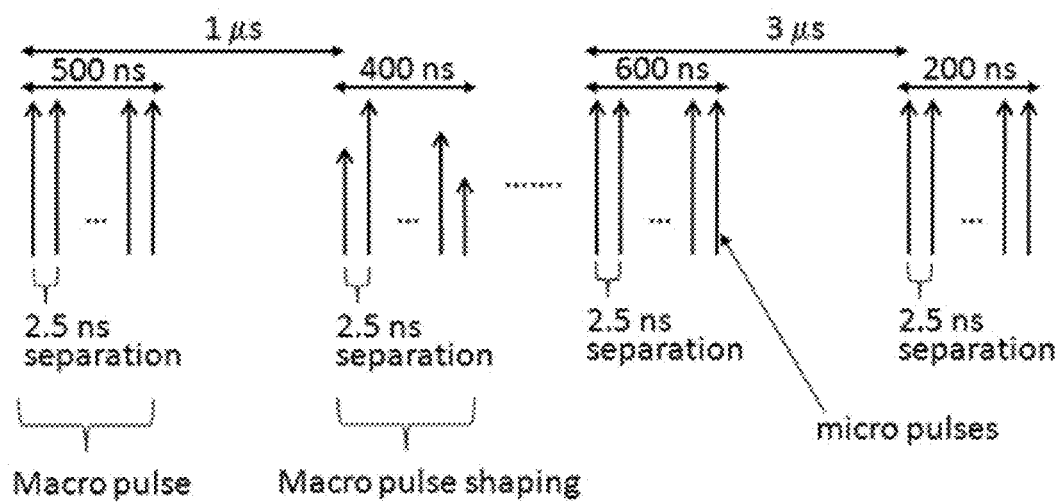
FIG. 6 is an illustration of pulse shaping to form micro pulses and macro pulses, in accordance with some embodiments.
Figure 7:
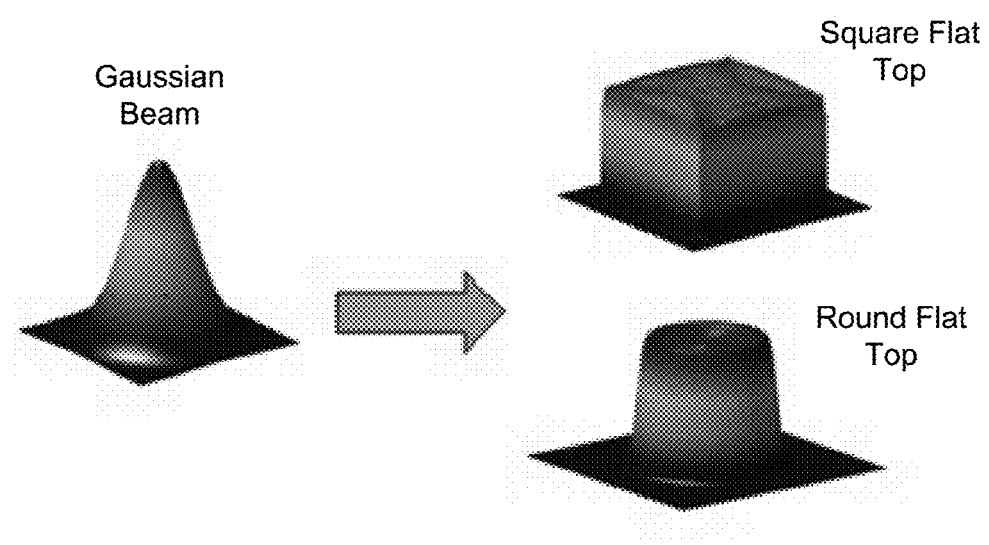
FIG. 7 is an illustration of beam shaping a Gaussian beam to a square or round flat top, in accordance with some embodiments.

In some embodiments, a computer 515 is first used to convert an AutoCAD or SolidWorks design to 3D printing procedures and contours. The conversion may also been done on some external computing device that is not part of the apparatus. The computer 515 is used to control the PRR, to generate a group of burst mode pulses (involve one or multiple micro pulses in one macro pulses, as shown in FIG. 6), to shape grouped micro and macro pulses in amplitude and temporal separation (Macro pulse PRR), to control the power of the laser 510, and to coordinate the scanner 520, to control the powder delivery system, and to control the linear and rotary motorized stages 535. In some embodiments, the high energy, high power pulse 505 is coupled into an auto focusing scanner 520 which scans and focuses the pulse 505 onto the sample 525 being manufactured from the powder 530 being deposited on the stage at first and then subsequent layers of the sample 525, resulting in a strong weld/bond between the sample and the powder. Beam shaping optics positioned between the ultrashort pulse laser and the focusing mechanism may also be used to modify the beam from Gaussian shape to flat top (square or round) as illustrated in FIG. 7. The sample 525, may be positioned using its own linear and rotary motor stages 535, in X, Y, Z, Θ, and Φ. The linear and rotary motor stages 535 may be controlled by the computer 515. An imager and processor 540, such as a CCD, may also be controlled by the computer 515. The imager and processor 540 monitors the samples through a dichroic filter 545 as the sample 525 is being additively manufactured. The scanner 520 may be an acousto-optic type scanner (diffraction), a magnetic resonant scanner, a mechanical scanner (rotating mirror), or an electro-optic scanner, etc.

Compared with conventional CW or nanosecond laser AM techniques, the high energy, high power fs laser AM system of FIG. 5 creates a much stronger micro-scale weld/bond between the sample 525 and the powder 530 through ultrafast ionization, chemical reaction, and thermal bonding. At the beginning of the AM process, similar or dissimilar metal powders are welded/bonded together to start the manufacture of the sample. Sample 525 can be either a pre-manufactured bulk part or powder. The additive manufacturing involves localized heating and is HAZ free since the micro-bond is accomplished by precise focusing of the ultrafast fs pulses on the joining interface of the sample and the powder. The resulting high peak intensity in the focal region ionizes the material of the sample and the powder and creates hot plasma at the interface with limited to no impact on the surrounding area (i.e., HAZ free). As the molten pool (resulting from temperatures going to over 5,000° C.) is localized and quickly built up only in the vicinity of the focus, the thermal stress and thermally induced cracks are largely suppressed. As a result of the nonlinear absorption around the focal volume of the laser pulses, the high energy, high power fs laser system can achieve highly space-selective joining with sub-micron spatial resolution resulting in a stable sub-micron powder bonding, thus offering a higher degree of design flexibility. Additionally, within an ultrashort period, the localized heating helps form stable phase structure and small grain size. As an example, bonding between nickel titanium (NiTi) and stainless steel using a high energy, high power fs laser system forms a stable single phase supersaturated β-Ti(Fe) structure.

In some embodiments, reduced directionality of the additive manufacturing may be achieved by using circularly polarized high energy, high power fs laser pulses scanned quickly and rotationally (wobble function) in micron scale onto the joining interface between the sample being manufactured and the injected powder. Doing so may break the directionality of dendritic structures, thus making the sample robust against mechanical and thermal stresses in all directions.

Specifically, in micro-device AM, a microscopic lens (high NA, >0.5 for example) may be used to create sub-micron size focal beam along beam shaping technique. The focal spot size in air for the laser beam can be calculated by 1.22*λ/N.A., where λ is the laser wavelength and N.A. is the numerical aperture of the objective lens. The method described in U.S. Pat. No. 8,675,193 (Near-field material processing system, Mar. 18, 2014) can also be used to make smaller 3D AM devices down to a few nanometers.

Figure 8A:
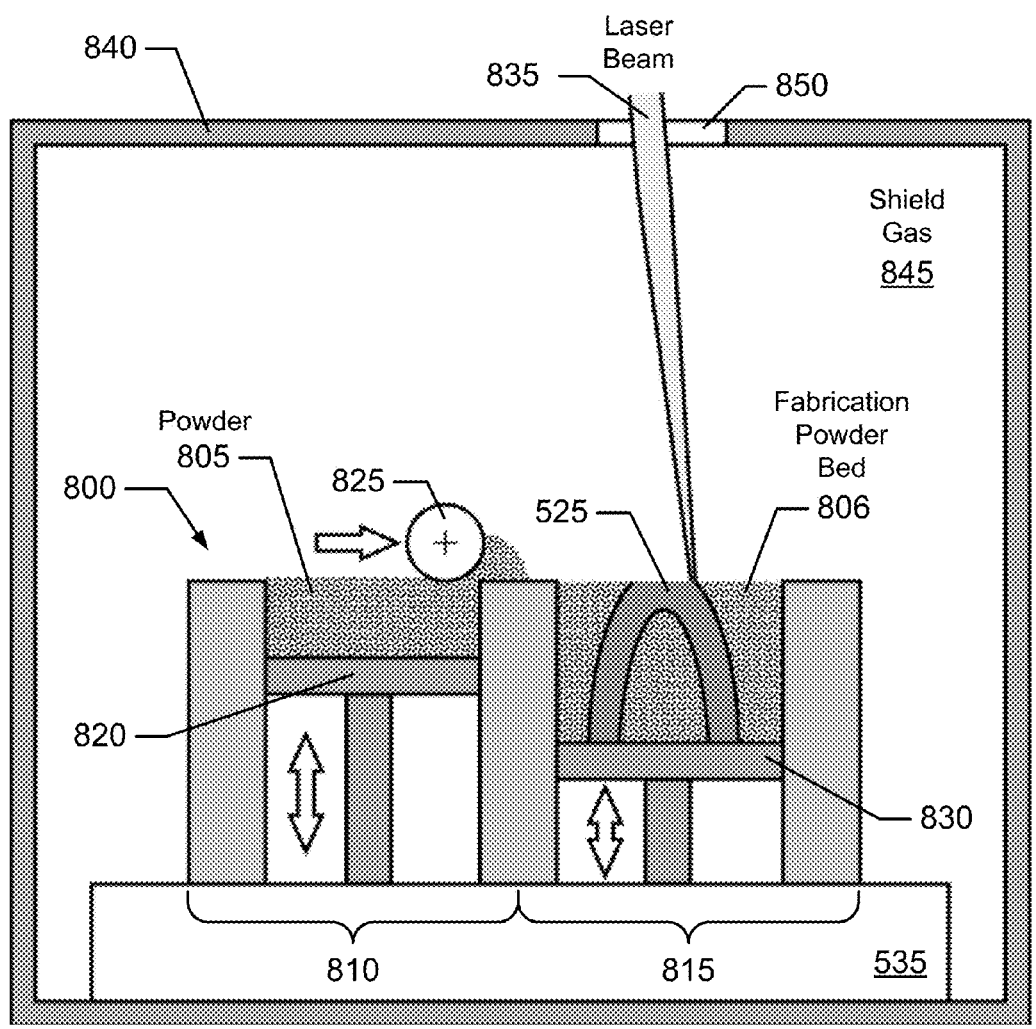
FIG. 8A is a schematic illustration of a powder delivery system for an apparatus for additive manufacturing by selective laser melting with a high energy high power ultrafast laser and FIG. 8B is a close-up of the melting of the powder of the fabrication powder bed, in accordance with some embodiments.
Figure 8B:
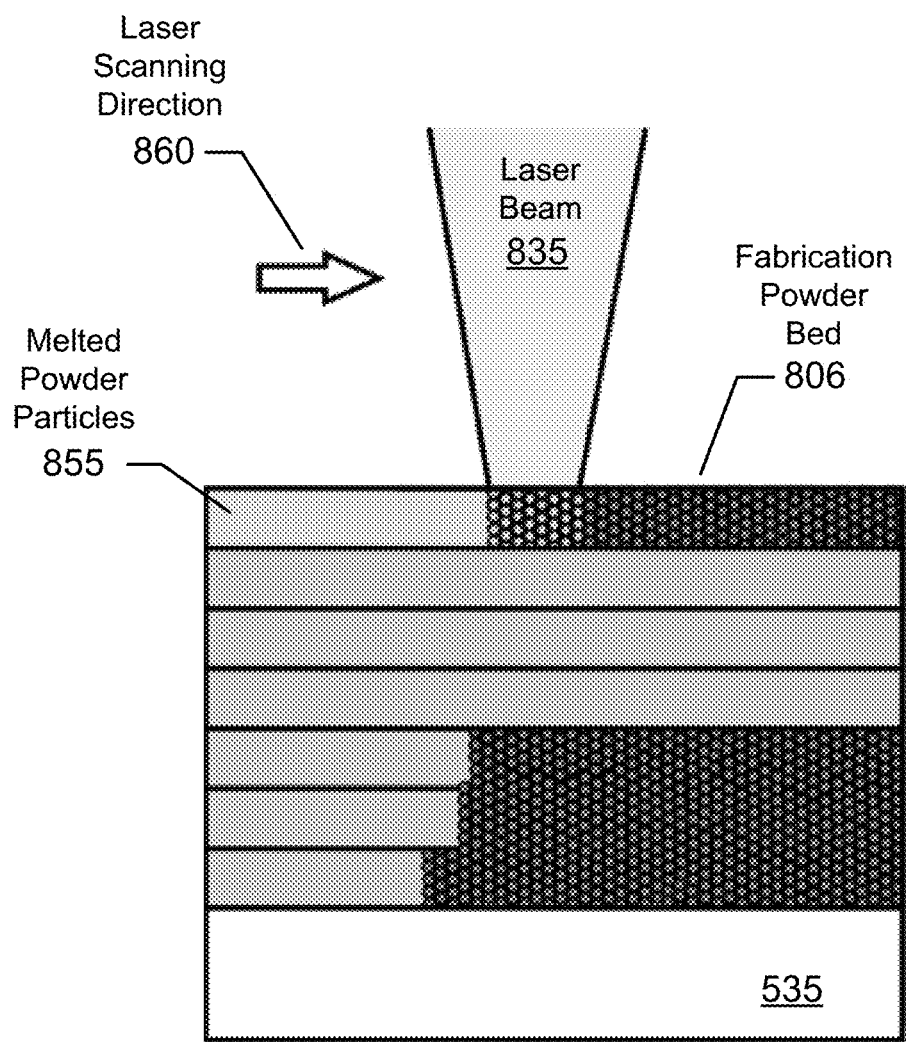

FIG. 8A is a schematic illustration of a powder delivery system for an apparatus for additive manufacturing by selective laser melting with a high energy high power ultrafast laser and FIG. 8B is a close-up of the melting of the powder of the fabrication powder bed, in accordance with some embodiments.

In some embodiments, powder delivery system 800 is placed onto the stage 535 of FIG. 5 for AM of the sample 525. The powder delivery system 800 comprises the powder 805 loaded into a powder vessel 810 placed adjacent to a receptacle 815 where the sample is fabricated. The powder vessel 810 has a powder delivery piston 820 that raises the level of the powder above the lip of the powder vessel. Next, a roller 825 moves the raised powder into the adjacent receptacle 815 and spreads the powder 805 into a smooth even layer. At the beginning of the AM, the fabrication powder bed 806 is first spread over a fabrication piston 830. After this first layer has been melted, the fabrication piston 830 is lowered and another layer of the powder 805 is uniformly spread into the fabrication powder bed 806 and over the just sintered layer for layer-by-layer fabrication. In some embodiments, at least the first layer is not sintered, thus providing a thermal barrier between the powder layer that is first melted and the fabrication piston 830. In the embodiment illustrated in FIGS. 8A and 8B, the laser beam 835 selectively melts the powder which has been uniformly spread into the receptacle 815. The laser beam 835 is scanned in the direction 860 over the fabrication powder bed 806 and results in melted powder particles 855. Since the temperature created by the ultrafast laser can be over the melting temperature of the powder, the powder is completely melted. For each specific powder, the laser parameters (energy, pulse width, pulse repetition rate average power, wavelength, etc.), the scanner speed, powder size and shape, and focal spot size are optimized to generate a temperature larger than the melting temperature of the powder, but lower than the boiling temperature of the powder. The powder 805 may comprise one or more different powder materials. The one or more different powder materials may comprise aluminum, steel, stainless steel, titanium, and the refractory metals, niobium, molybdenum, tantalum, tungsten, and rhenium. The one or more different powders may also comprise ceramics such as hafnium (Hf) and zirconium (Zr) based diboride ($HfB_2$ and $ZrB_2$), titanium carbide (TiC), titanium nitride (TiN), thorium dioxide ($ThO_2$), silicon carbide (SiC), tantalum carbide (TaC) and their associated composites. The one or more different powders may also comprise glasses and crystals such as fused silicon, BK7, quartz, diamond, grapheme, sapphire, and others. The one or more different powders may also comprise semiconductors such as silicon, germanium, GaAs, etc. The powder size of the material ranges from about 0.01 micron to 50 microns, preferably less than 10 micron. The powder shape of the material is preferably a round sphere shape. In some embodiments, the stage 535 with the powder delivery system 800 is enclosed in a chamber 840 filled with a shield gas 845 such as argon, helium, nitrogen, and/or hydrogen to help the sample avoid oxidation and chemical reaction or interaction with air. The ionization potentials for argon and helium are 15.7 eV and 24.5 eV. In this embodiment, the chamber has a window 850 where the laser beam 835 passes through the walls of the chamber 840 and onto the fabrication powder bed 806 in the receptacle 815. In an alternative embodiment, the chamber only substantially encloses the powder delivery system and not the stage. In this embodiment the chamber and the powder delivery system both sit on the stage. The additive manufacturing may be performed onto any size and shape substrate using the apparatus illustrated in FIG. 5, FIG. 8A, and FIG. 8B.

In an alternative embodiment, the powder vessel comprises a hopper placed above the receptacle, wherein when the hopper is opened, the force of gravity causes the powder to fall towards and onto the receptacle. Between selective laser melting of a layer, the powder is dispensed from the hopper and onto the already processed layer. After being dispensed, a roller is brought into contact with the dispensed powder and moved across the manufacturing region to spread the powder into a smooth even layer. The layer is then ready for SLM. This process is repeated until fabrication of the sample has been completed.

Figure 9:
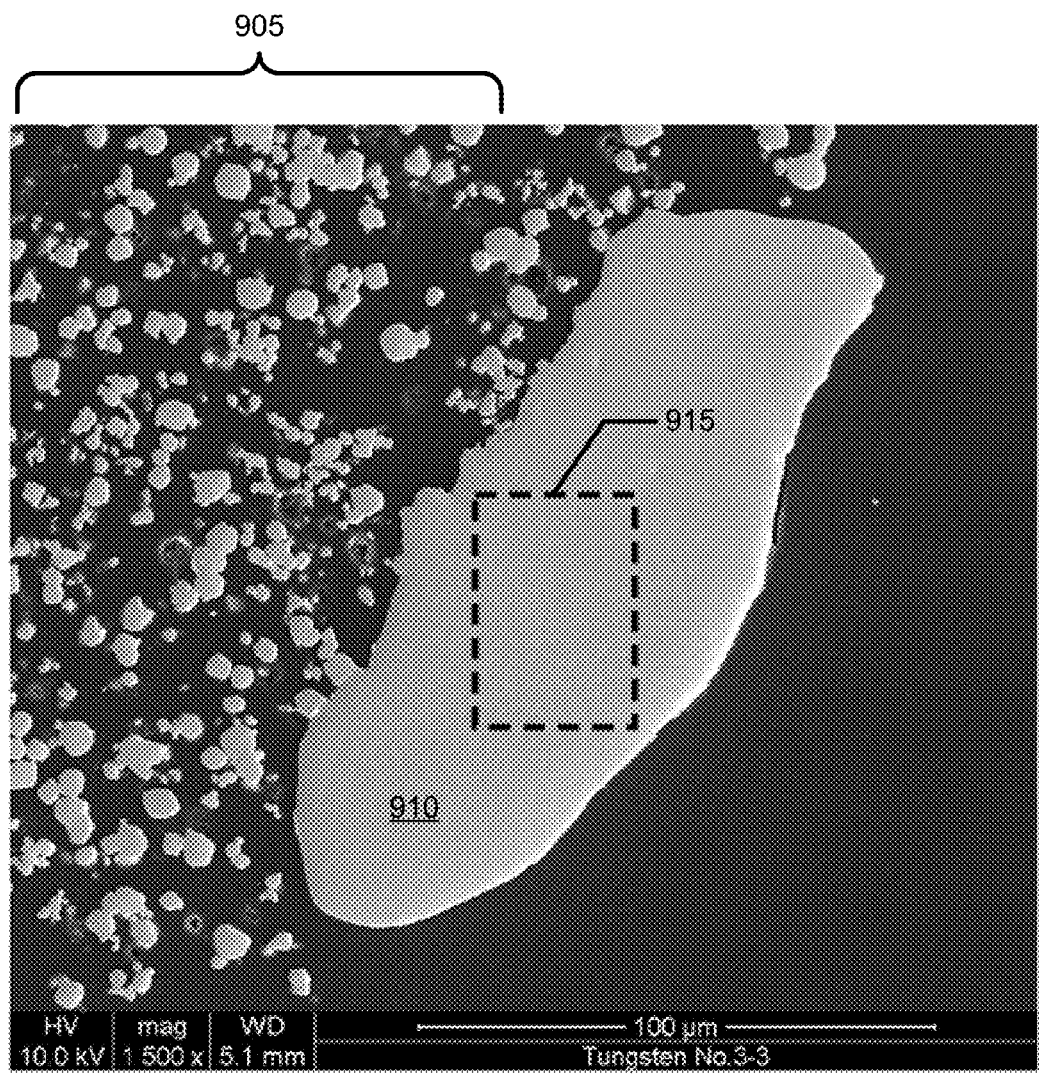
FIG. 9 is an SEM of a formed shaped structure resulting from selective laser melting of tungsten powder, in accordance with some embodiments.

FIG. 9 is an SEM of a formed shaped structure resulting from selective laser melting of tungsten powder, in accordance with some embodiments.

Figure 10:
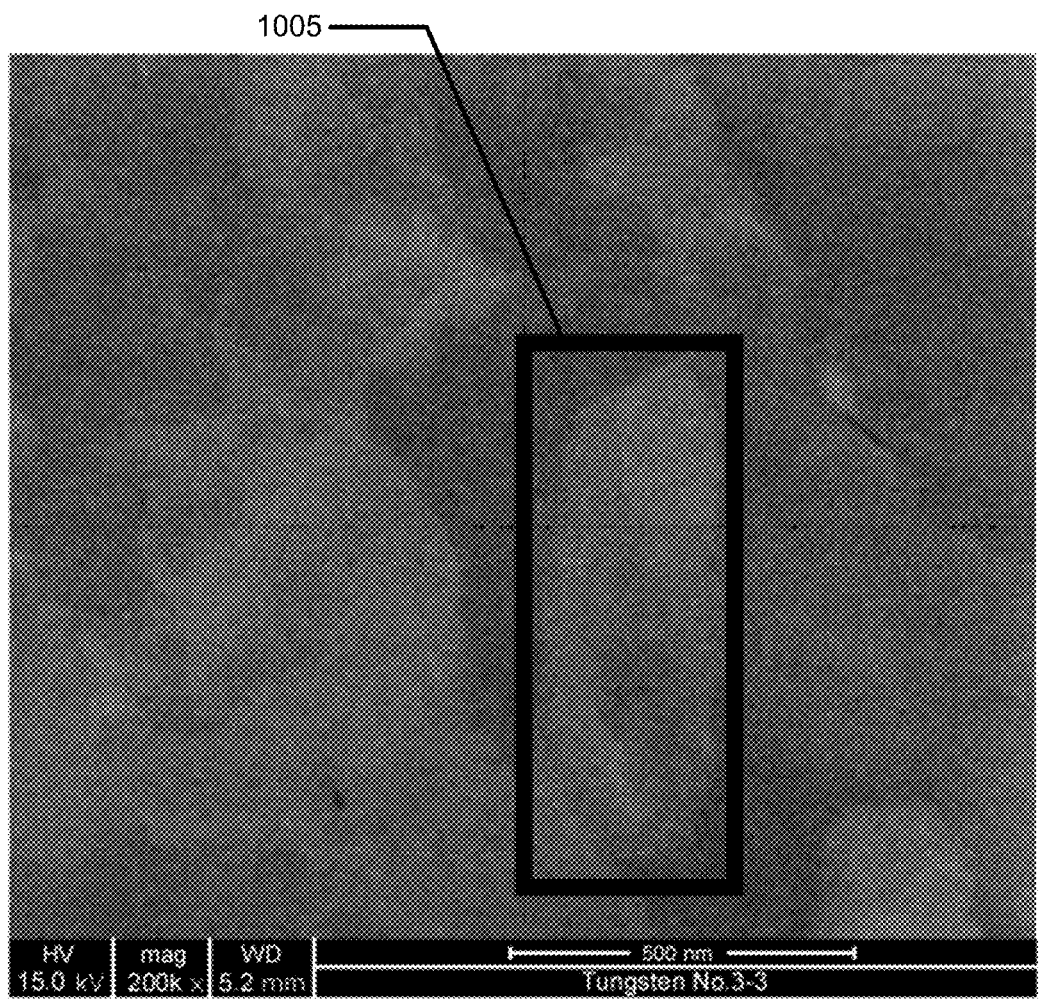
FIG. 10 is an SEM of the cross-section of the formed shaped structure resulting from selective laser melting of tungsten powder, in accordance with some embodiments.

FIG. 10 is an SEM of the cross-section of the formed shaped structure resulting from selective laser melting of tungsten powder, in accordance with some embodiments.

Figure 11:
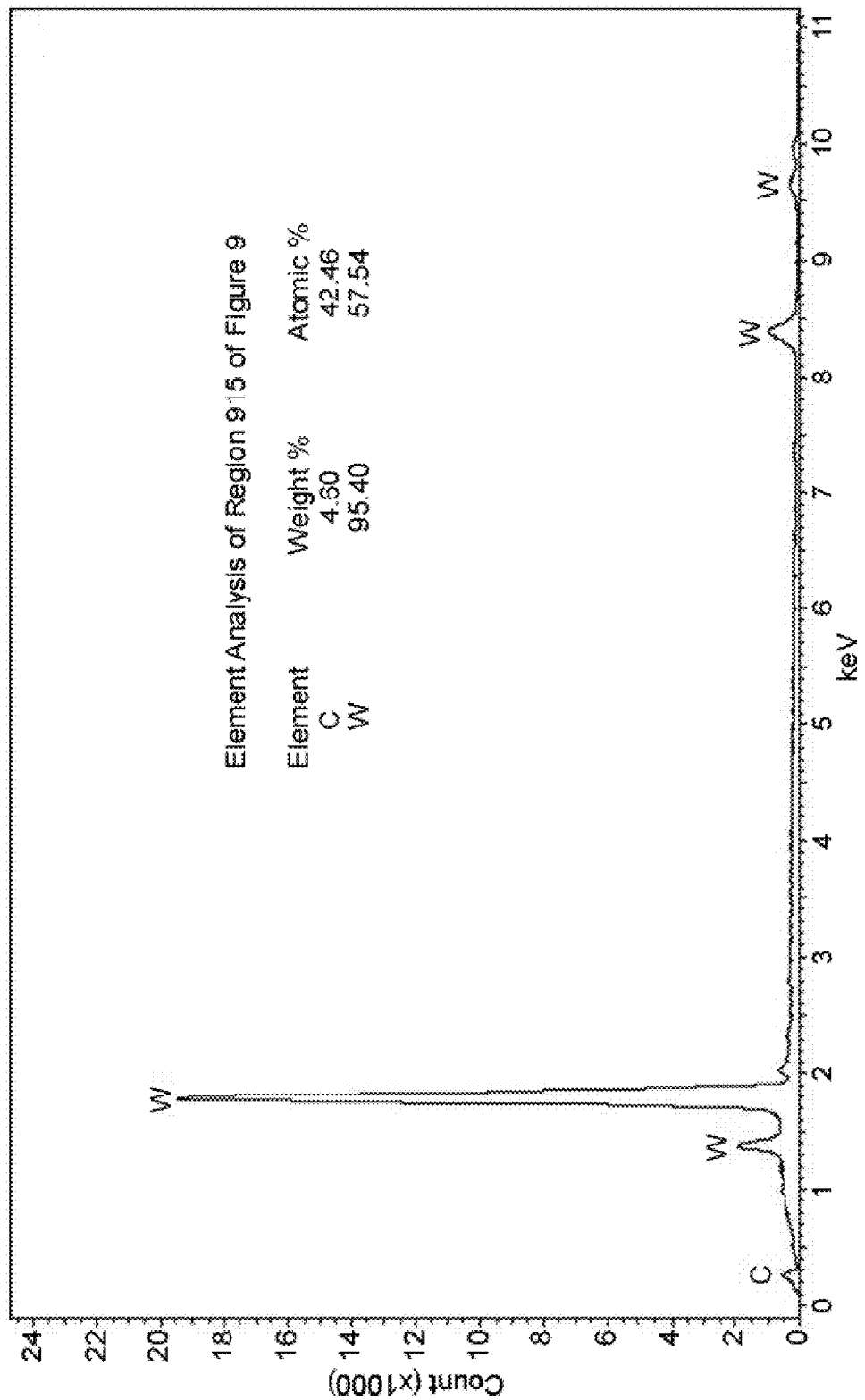
FIG. 11 is an EDX spectrum of a fully melted region of the formed shaped structure resulting from selective laser melting of tungsten powder, in accordance with some embodiments.

FIG. 11 is an EDX spectrum of a fully melted region of the formed shaped structure resulting from selective laser melting of tungsten powder, in accordance with some embodiments.

In some embodiments, a high energy, high power ultrafast fiber laser operating with a 30 mJ pulse energy, a 1 MHz repetition rate, and a 1 mm/s scanning speed is used to sinter a tungsten powder layer comprised of 10 micron size tungsten powder. An argon shield gas is used during the sintering of the powder. FIG. 9 shows a partially melted region 905 and a formed shaped structure 910 which has been completely melted. FIG. 10 shows an SEM of the cross-section of the completely melted region of the formed shaped structure 910. A sub-micron grain as shown within region 1005 indicates that the 10 micron size tungsten powder has completely melted and been recrystallized. No voids or cracks are observed in the cross-section of the completely melted region. The uniform submicron grain size observed under SEM indicates that a strong bond results from using the high energy, high power ultrafast fiber laser at high PRR. Formed shaped structures as long as 20 mm in length, width, and thickness may be manufactured using the apparatus illustrated in FIG. 5, FIG. 8A, and FIG. 8B. FIG. 11 shows an energy-dispersive X-ray (EDX) spectrum of the completely melted region marked by dashed box 915 of FIG. 9. The 4.6% by weight carbon (C) that was detected is a result of the epoxy that was used for processing the sample for SEM. No oxygen was detected in the region indicated by 915 which means that the melt was 100%.

Figure 12:
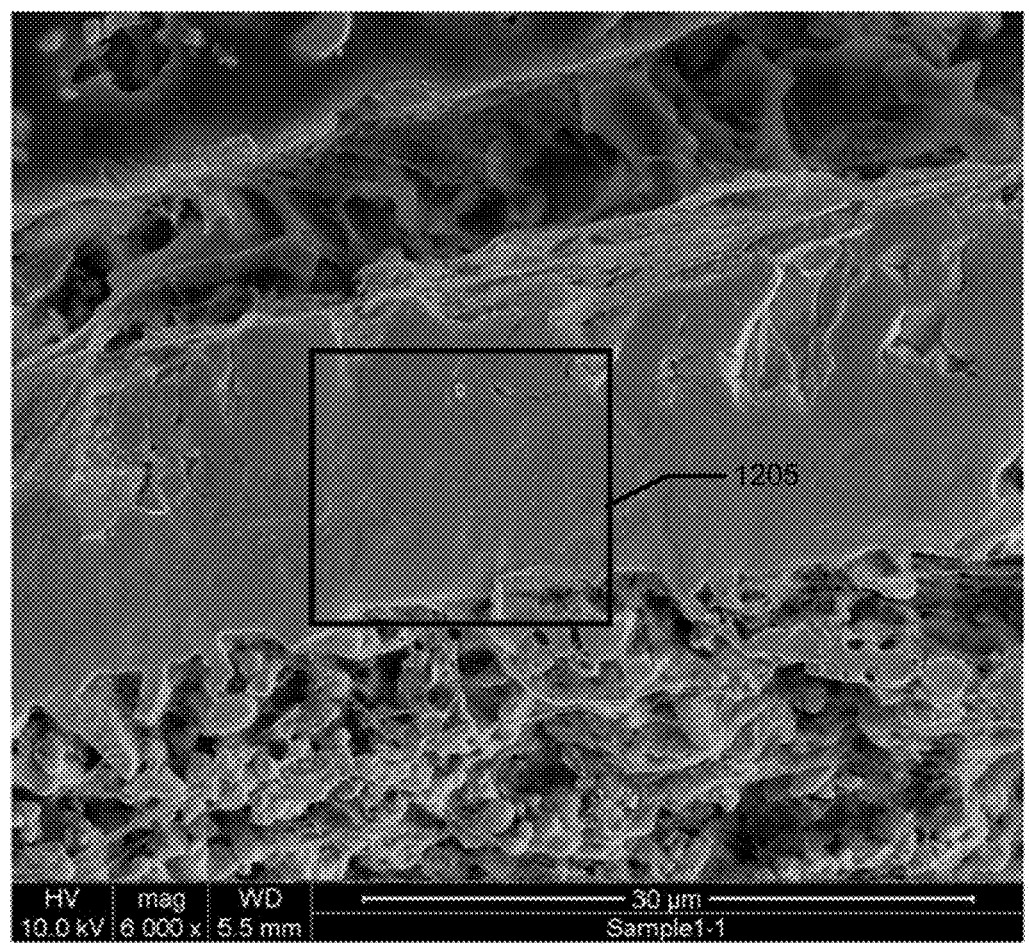
FIG. 12 is an SEM of a ceramic wire resulting from selective laser melting of hafnium diboride ($HfB_2$) powder, in accordance with some embodiments.

FIG. 12 is an SEM of a ceramic wire resulting from selective laser melting of hafnium diboride ($HfB_2$) powder, in accordance with some embodiments.

Figure 13:
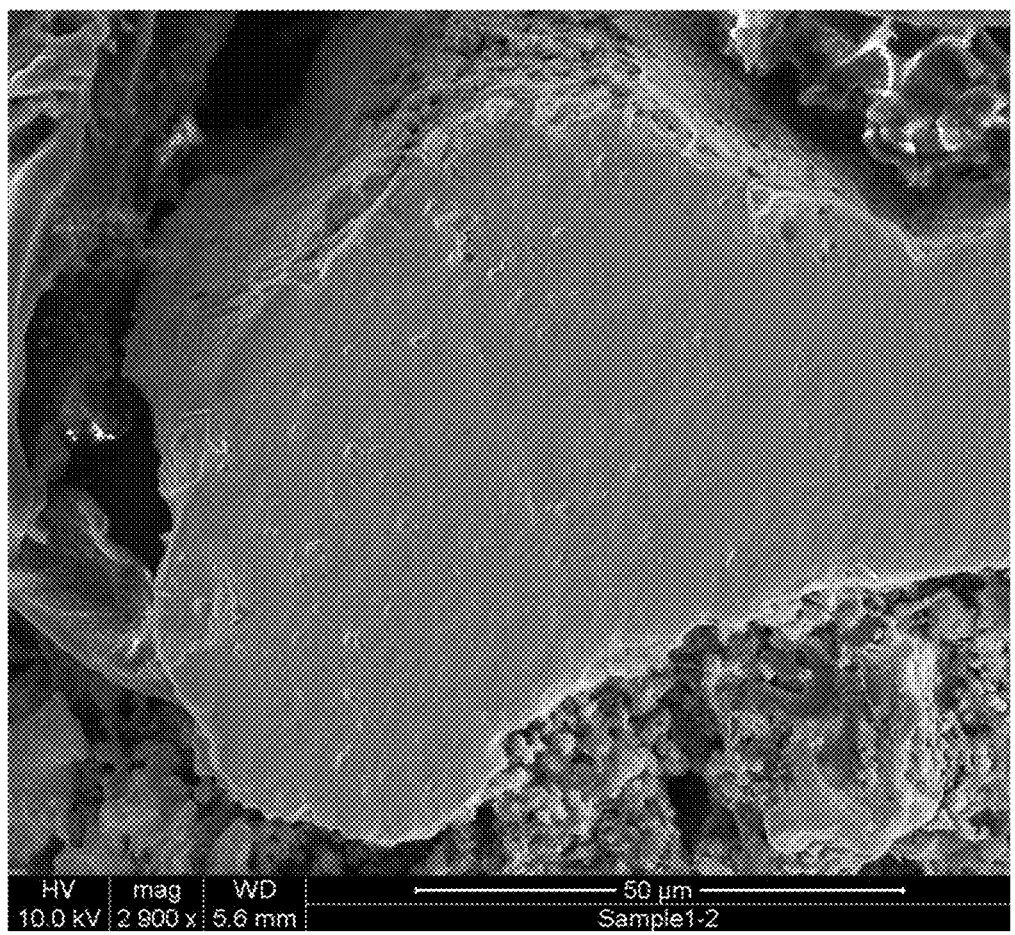
FIG. 13 is an SEM of the cross-section of the ceramic wire resulting from selective laser melting of $HfB_2$ powder, in accordance with some embodiments.

FIG. 13 is an SEM of the cross-section of the ceramic wire resulting from selective laser melting of $HfB_2$ powder, in accordance with some embodiments.

Figure 14:
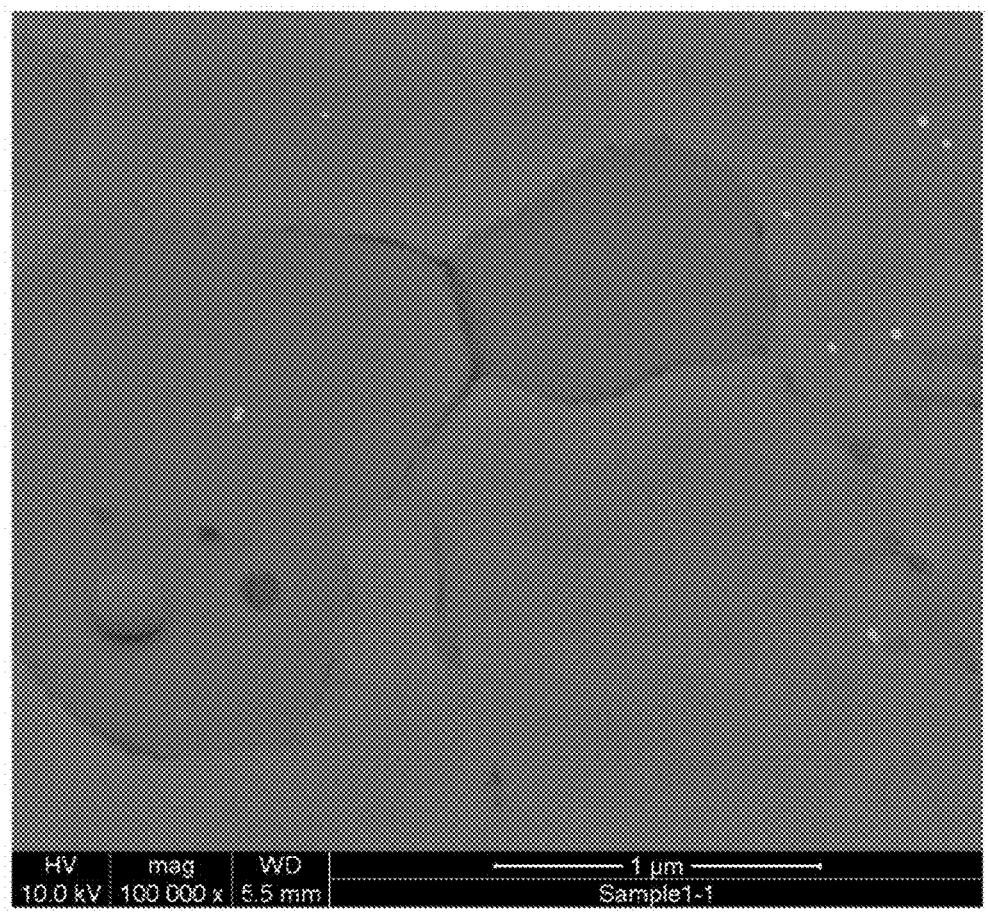
FIG. 14 is an SEM of the grain structure of the ceramic wire resulting from selective laser melting of $HfB_2$ powder, in accordance with some embodiments.

FIG. 14 is an SEM of the grain structure of the ceramic wire resulting from selective laser melting of $HfB_2$ powder, in accordance with some embodiments.

Figure 15:
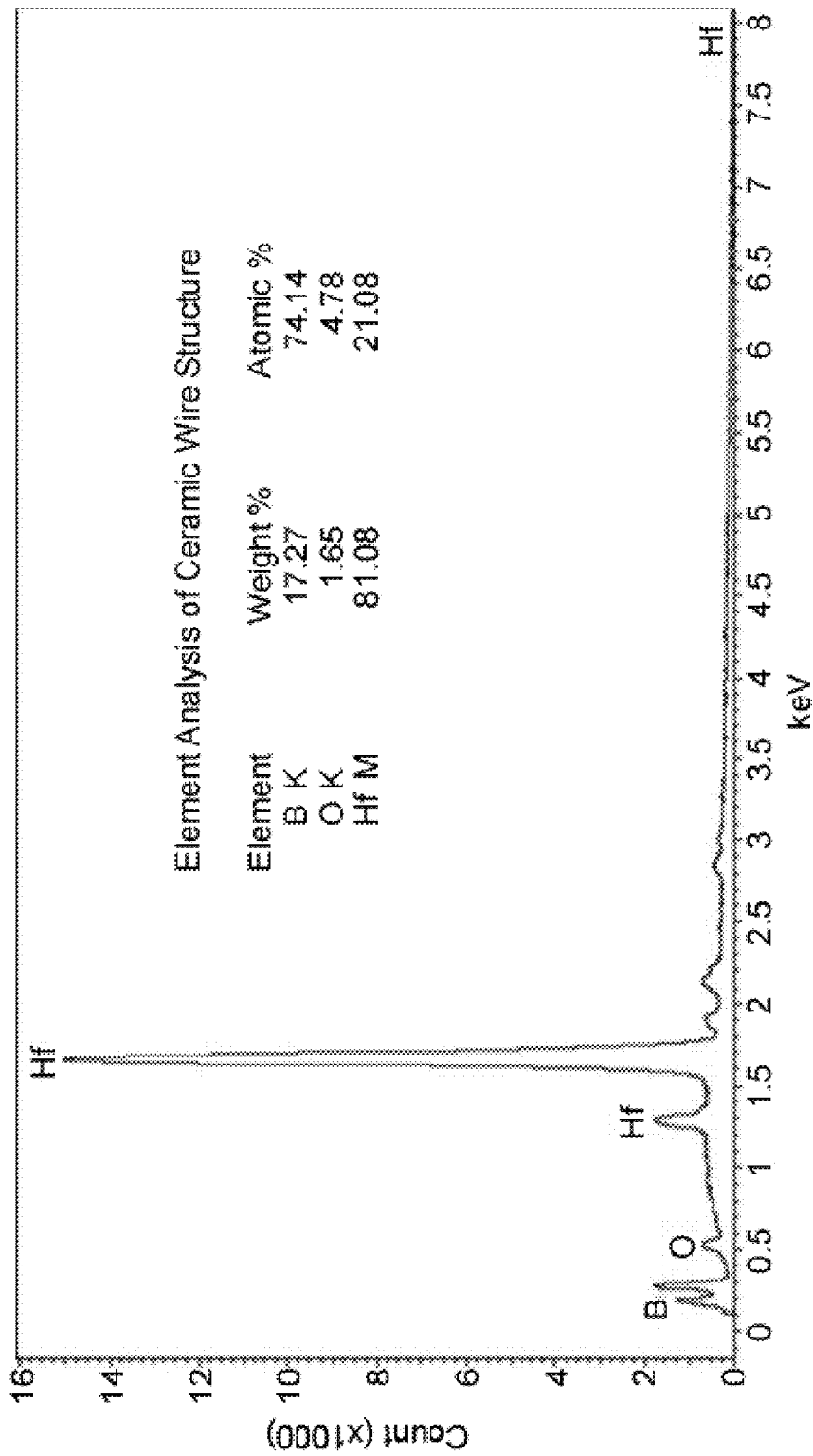
FIG. 15 is an EDX spectrum of a fully melted region of the ceramic wire resulting from selective laser melting of $HfB_2$ powder, in accordance with some embodiments.

FIG. 15 is an EDX spectrum of a fully melted region of the ceramic wire resulting from selective laser melting of $HfB_2$ powder, in accordance with some embodiments.

In some embodiments, a 1 MHz, 50 W fs fiber laser (with 20 μm spot size) is focused onto hafnium diboride powder (with a 10 micron powder diameter size) to write a small ceramic wire with a 10 mm length and a 20-50 μm width. An argon shield gas is used during the sintering of the powder. An SEM of the wire is shown in FIG. 12. The region 1205 shows that the ceramic wire has less than 3 μm roughness, which indicates that the $HfB_2$ powder was completely melted during the sintering. An SEM of the cross-section at 2,900× magnification is shown in FIG. 13. No voids or cracks are visible in the cross-section of the ceramic wire. The SEM of the cross-section at 100,000× magnification, as shown in FIG. 14, reveals that the grain microstructure is less than 2 μm. The small grain microstructure is beneficial for high strength structures. An EDX spectrum of the ceramic wire is shown in FIG. 15. The EDX spectrum reveals that the ceramic wire was comprised of 81.08% by weight of hafnium and 17.27% by weight of boron. A trace of oxygen, 1.65% by weight, was detected in the ceramic wire. The small oxygen peak resulted from the imperfect argon shielding during sintering. Overall, the 1 MHz, 50 W fs fiber laser was capable of practically bonding an ultra-high temperature ceramic powder into a three-dimensional additively manufactured structure by completely melting the $HfB_2$ powder into a structure with 20-50 μm feature size, which is key for the fabrication of components with tiny radii.

Figure 16:
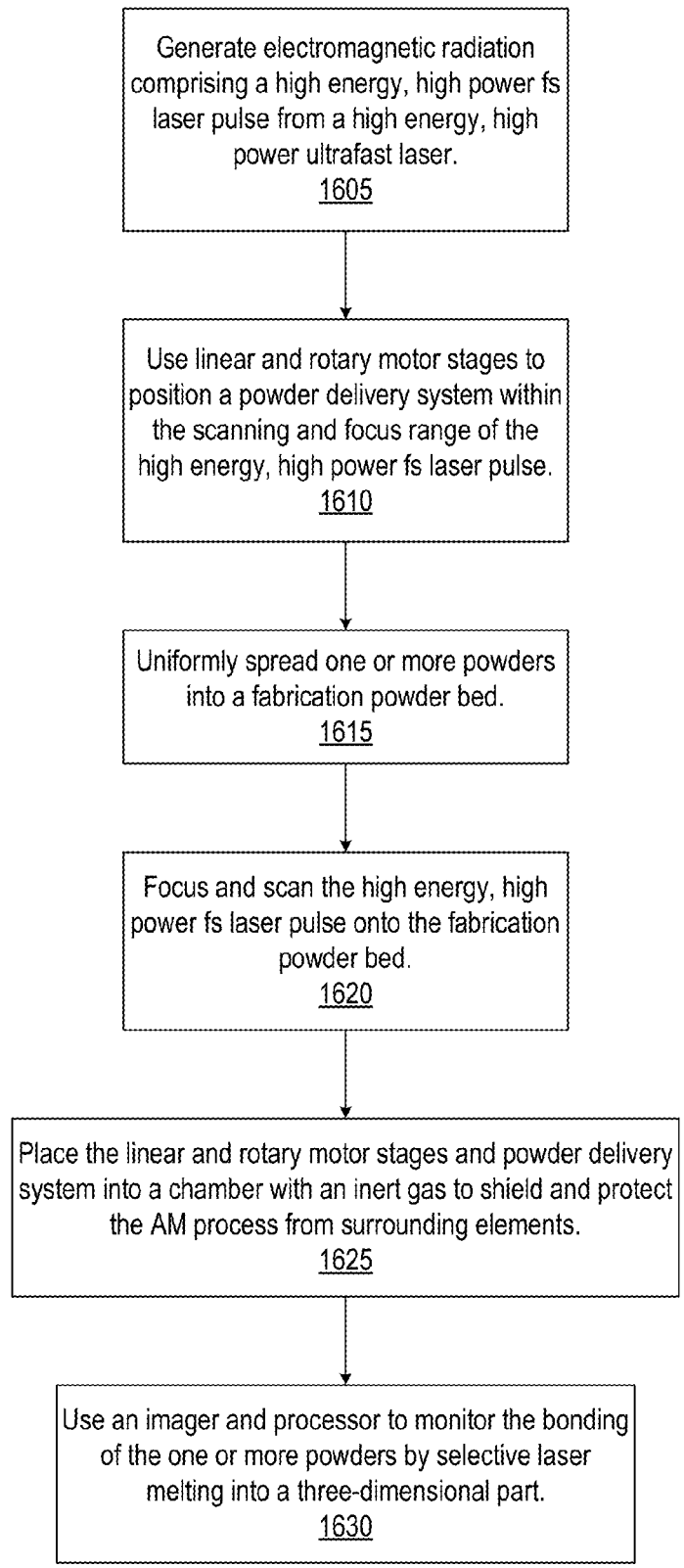
FIG. 16 is a block diagram illustrating a method for additive manufacturing by selective laser melting with a high energy high power ultrafast laser, in accordance with some embodiments.

FIG. 16 is a block diagram illustrating a method for additive manufacturing by selective laser melting with a high energy high power ultrafast laser, in accordance with some embodiments.

In some embodiments, processing begins at step 1605 where a high energy, high power ultrafast laser is used to generate electromagnetic radiation comprising a high energy, high power fs laser pulse. The main characteristic of the ultrashort laser pulse is the high peak intensity that results in rapid (picosecond) delivery of energy into the material, which is much faster than the plasma expansion (nanosecond to microsecond), thus significantly reducing or eliminating thermal damages. In some embodiments, the high energy, high power laser pulse is generated by a high PRR fs laser. In other embodiments, the laser is a fiber laser. The high energy, high power laser may also be a thin disk laser or a hybrid fiber laser/thin disk laser. The laser will have a PRR from about 0.1 MHz up to 1 GHz, an average power of about 1 to 2000 W, a pulse width of about 0.1 to 1 ns, an energy from about 0.1 μJ to 30 mJ, and a wavelength between about 0.2 to 3 μm. Examples of ultrafast fiber lasers include but are not limited to Yb doped fiber laser at 1025-1100 nm and its harmonic generations to green and UV, Er doped fiber laser at 1025-1610 nm and its harmonic generations, Tm doped fiber laser at 1950-2050 nm, Ho doped fiber laser at 2050-2150 nm, and Er:ZBLAN fiber lasers at 2700-2900 nm. Examples of thin disk lasers include but are not limited to KGW or KYW based lasers (1030-1070 nm) and its harmonic generations (green and UV). At step 1610, linear and rotary motor stages are used to position a powder delivery system within the scanning and focus range of the high energy, high power fs laser pulse. At step 1615, one or more powders are uniformly spread into a fabrication powder bed for selective laser melting by the high energy, high power fs laser. At step 1620, the high energy, high power fs laser pulse is focused and scanned onto the fabrication powder bed of the powder delivery system. The resulting high peak intensity in the focal region ionizes the material of the powder and creates hot plasma with limited to no impact on the surrounding area (i.e., HAZ free). As the molten pool is localized and quickly built up only in the vicinity of the focus, the thermal stress and thermally induced cracks are largely suppressed. In some embodiments, the high energy, high power fs laser pulse comprises circularly polarized laser pulses which are rotationally scanned in micron scale across the sample in order to break the directionality of dendritic structures. The resulting weld/bond joints are more robust against mechanical and thermal stresses in all directions. In some embodiments, the method further comprises at step 1625 placing the linear and rotary motor stages and powder delivery system into a chamber with an inert gas to shield and protect the AM process from the surrounding elements. In some embodiments, the method further comprises at step 1630, the use of an imager and processor to monitor the sample as the one or more powders are being bonded together by selective laser melting to form a three-dimensional component or part.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. An apparatus for three-dimensional additive manufacturing comprising:
   an ultrashort pulse laser, wherein the ultrashort pulse laser generates an electromagnetic radiation, wherein the electromagnetic radiation comprises a wavelength, a pulse repetition rate, a pulse width, a pulse energy, and an average power;
   a focusing mechanism comprising a focus range, and wherein the focusing mechanism is configured to focus the electromagnetic radiation into a focal region;
   a powder delivery system, wherein the powder delivery system comprises:
      a powder vessel;
      a roller; and
      a receptacle;
      wherein the powder delivery system is configured to deposit one or more powders into the receptacle at the focal region of the electromagnetic radiation;
      wherein the powder vessel is configured to hold the one or more powders; and
      wherein the roller is configured to spread the one or more powders in the receptacle into a fabrication powder bed; and
   a computer coupled to the ultrashort pulse laser, wherein the computer is configured to adjust the pulse repetition rate and the average power of the ultrashort pulse laser and configured to program the electromagnetic radiation into temporally arbitrarily grouped micro and macro pulses and to spatially shape the micro and macro pulses.

2. The apparatus of claim 1, wherein the powder vessel comprises a powder delivery piston configured to raise the one or more powders above the lip of the powder vessel.

3. The apparatus of claim 1, wherein the powder vessel comprises a hopper configured to drop the one or more powders into the receptacle.

4. The apparatus of claim 1, wherein the receptacle comprises a fabrication piston configured to lower the fabrication powder bed.

5. The apparatus of claim 1, wherein the one or more powders comprises at least one of aluminum, steel, stainless steel, titanium, niobium, molybdenum, tantalum, tungsten, rhenium, hafnium diboride, zirconium diboride, titanium carbide, titanium nitride, thorium dioxide, silicon carbide, tantalum carbide, fused silicon, BK7, quartz, diamond, graphene, sapphire, silicon, germanium, and gallium arsenide.

6. The apparatus of claim 1, wherein the one or more powders comprises a powder with melting temperatures greater than 2000° C.

7. The apparatus of claim 1, wherein the one or more powders comprises a powder with melting temperatures less than 2000° C.

8. The apparatus of claim 1, wherein the apparatus is configured for high resolution additive manufacturing with micron and/or sub micron level precision and/or feature size.

9. The apparatus of claim 1, wherein the one or more powders comprises a powder size ranging from about 0.01 µm to about 50 µm.

10. The apparatus of claim 1, further comprising a chamber configured to substantially enclose the powder delivery system, wherein the chamber is filled with one or more shield gases.

11. The apparatus of claim 10, wherein the one or more shield gases comprises at least one of argon, helium, nitrogen, and hydrogen.

12. The apparatus of claim 1, wherein the focusing mechanism further comprises: a scanner comprising a scanning range, and wherein the scanner is configured to receive the electromagnetic radiation from the ultrashort pulse laser and to scan the electromagnetic radiation onto the one or more powders to produce a sample.

13. The apparatus of claim 1, wherein the focusing mechanism further comprises a microscopic lens, wherein the microscopic lens is configured to receive the electromagnetic radiation from the ultrashort pulse laser and to focus the electromagnetic radiation onto the one or more powders to produce a sample, wherein the size of the sample ranges from about 0.1 µm to 20 mm.

14. The apparatus of claim 1, further comprising one or more stages to support the powder delivery system, wherein the one or more stages are configured to position the powder delivery system in one or more axis within the focus range of the electromagnetic radiation.

15. The apparatus of claim 1, further comprising:
   a dichroic filter positioned between the focusing mechanism and the focal region; and an imager and processor focused through the dichroic filter and onto a sample, wherein the imager and processor are configured to monitor the sample within the focus range of the electromagnetic radiation.

16. The apparatus of claim 1, wherein the ultrashort pulse laser comprises at least one of a Yb doped fiber laser, an Er doped fiber laser, a Tm doped fiber laser, a Ho doped fiber laser, an Er:ZBLAN fiber laser, a KGW thin disk laser, and a KYW thin disk laser.

17. The apparatus of claim 1, wherein the wavelength of the electromagnetic radiation generated from the ultrashort pulse laser ranges from about 0.2 μm to 3 μm.

18. The apparatus of claim 1, wherein the pulse repetition rate of the electromagnetic radiation generated from the ultrashort pulse laser ranges from about 0.1 MHz to 1 GHz.

19. The apparatus of claim 1, wherein the pulse width of the electromagnetic radiation generated from the ultrashort pulse laser ranges from about 0.1 ps to 1 ns.

20. The apparatus of claim 1, wherein the pulse energy of the electromagnetic radiation generated from the ultrashort pulse laser ranges from about 0.1 μJ to 30 mJ.

21. The apparatus of claim 1, wherein the average power of the electromagnetic radiation generated from the ultrashort pulse laser ranges from about 1 W to 2000 W.

22. The apparatus of claim 1, wherein the electromagnetic radiation is polarized.

23. The apparatus of claim 22, wherein the electromagnetic radiation is circularly polarized.

24. The apparatus of claim 12, wherein the scanner is further configured to rotationally scan on a micron scale the electromagnetic radiation onto the one or more powders.

25. The apparatus of claim 1, further comprising beam shaping optics positioned between the ultrashort pulse laser and the focusing mechanism, wherein the beam shaping optics is configured to modify the electromagnetic radiation from a Gaussian to a flat top and wherein the flat top is square or circular.

26. An apparatus for three-dimensional additive manufacturing comprising:
- an ultrashort pulse laser, wherein the ultrashort pulse laser generates an electromagnetic radiation, wherein the electromagnetic radiation comprises a wavelength, a pulse repetition rate, a pulse width, a pulse energy, and an average power;
- a focusing mechanism comprising a focus range, and wherein the focusing mechanism is configured to focus the electromagnetic radiation into a focal region;
- beam shaping optics positioned between the ultrashort pulse laser and the focusing mechanism, wherein the beam shaping optics is configured to modify the electromagnetic radiation from a Gaussian to a flat top and wherein the flat top is square or circular;
- a powder delivery system, wherein the powder delivery system comprises:
  - a powder vessel;
  - a roller; and
  - a receptacle;
  - wherein the powder delivery system is configured to deposit one or more powders into the receptacle at the focal region of the electromagnetic radiation;
  - wherein the powder vessel is configured to hold the one or more powders; and
  - wherein the roller is configured to spread the one or more powders in the receptacle into a fabrication powder bed; and
- a computer coupled to the ultrashort pulse laser, wherein the computer is configured to adjust the pulse repetition rate and the average power of the ultrashort pulse laser.

27. The apparatus of claim 26, wherein the powder vessel comprises a powder delivery piston configured to raise the one or more powders above the lip of the powder vessel.

28. The apparatus of claim 26, wherein the powder vessel comprises a hopper configured to drop the one or more powders into the receptacle.

29. The apparatus of claim 26, wherein the receptacle comprises a fabrication piston configured to lower the fabrication powder bed.

30. The apparatus of claim 26, wherein the one or more powders comprises at least one of aluminum, steel, stainless steel, titanium, niobium, molybdenum, tantalum, tungsten, rhenium, hafnium diboride, zirconium diboride, titanium carbide, titanium nitride, thorium dioxide, silicon carbide, tantalum carbide, fused silicon, BK7, quartz, diamond, graphene, sapphire, silicon, germanium, and gallium arsenide.

31. The apparatus of claim 26, wherein the one or more powders comprises a powder with melting temperatures greater than 2000° C.

32. The apparatus of claim 26, wherein the one or more powders comprises a powder with melting temperatures less than 2000° C.

33. The apparatus of claim 26, wherein the apparatus is configured for high resolution additive manufacturing with micron and/or sub micron level precision and/or feature size.

34. The apparatus of claim 26, wherein the one or more powders comprises a powder size ranging from about 0.01 μm to about 50 μm.

35. The apparatus of claim 26, further comprising a chamber configured to substantially enclose the powder delivery system, wherein the chamber is filled with one or more shield gases.

36. The apparatus of claim 35, wherein the one or more shield gases comprises at least one of argon, helium, nitrogen, and hydrogen.

37. The apparatus of claim 26, wherein the focusing mechanism further comprises: a scanner comprising a scanning range, and wherein the scanner is configured to receive the electromagnetic radiation from the ultrashort pulse laser and to scan the electromagnetic radiation onto the one or more powders to produce a sample.

38. The apparatus of claim 26, wherein the focusing mechanism further comprises a microscopic lens, wherein the microscopic lens is configured to receive the electromagnetic radiation from the ultrashort pulse laser and to focus the electromagnetic radiation onto the one or more powders to produce a sample, wherein the size of the sample ranges from about 0.1 μm to 20 mm.

39. The apparatus of claim 26, further comprising one or more stages to support the powder delivery system, wherein the one or more stages are configured to position the powder delivery system in one or more axis within the focus range of the electromagnetic radiation.

40. The apparatus of claim 26, further comprising:
- a dichroic filter positioned between the focusing mechanism and the focal region; and
- an imager and processor focused through the dichroic filter and onto a sample, wherein the imager and processor are configured to monitor the sample within the focus range of the electromagnetic radiation.

41. The apparatus of claim 26, wherein the ultrashort pulse laser comprises at least one of a Yb doped fiber laser, an Er doped fiber laser, a Tm doped fiber laser, a Ho doped fiber laser, an Er:ZBLAN fiber laser, a KGW thin disk laser, and a KYW thin disk laser.

42. The apparatus of claim 26, wherein the wavelength of the electromagnetic radiation generated from the ultrashort pulse laser ranges from about 0.2 µm to 3 µm.

43. The apparatus of claim 26, wherein the pulse repetition rate of the electromagnetic radiation generated from the ultrashort pulse laser ranges from about 0.1 MHz to 1 GHz.

44. The apparatus of claim 26, wherein the pulse width of the electromagnetic radiation generated from the ultrashort pulse laser ranges from about 0.1 ps to 1 ns.

45. The apparatus of claim 26, wherein the pulse energy of the electromagnetic radiation generated from the ultrashort pulse laser ranges from about 0.1 µJ to 30 mJ.

46. The apparatus of claim 26, wherein the average power of the electromagnetic radiation generated from the ultrashort pulse laser ranges from about 1 W to 2000 W.

47. The apparatus of claim 26, wherein the electromagnetic radiation is polarized.

48. The apparatus of claim 47, wherein the electromagnetic radiation is circularly polarized.

49. The apparatus of claim 37, wherein the scanner is further configured to rotationally scan on a micron scale the electromagnetic radiation onto the one or more powders.

* * * * *